(12) United States Patent
Shim et al.

(10) Patent No.: US 9,513,736 B2
(45) Date of Patent: *Dec. 6, 2016

(54) MOBILE TERMINAL

(71) Applicant: LG Electronics Inc., Seoul (KR)

(72) Inventors: Hongjo Shim, Seoul (KR); Seonghyok Kim, Seoul (KR); Haengchul Kwak, Seoul (KR); Hyejin Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,156

(22) Filed: Dec. 30, 2015

(65) Prior Publication Data

US 2016/0110003 A1   Apr. 21, 2016

Related U.S. Application Data

(63) Continuation of application No. 14/015,876, filed on Aug. 30, 2013, now Pat. No. 9,262,006.

(30) Foreign Application Priority Data

Mar. 6, 2013   (KR) .......................... 10-2013-0024073

(51) Int. Cl.
*G06F 3/041* (2006.01)
*G06F 3/0487* (2013.01)
*G06F 1/16* (2006.01)
*G06F 3/0488* (2013.01)
*G06F 3/0354* (2013.01)

(52) U.S. Cl.
CPC ........... *G06F 3/0412* (2013.01); *G06F 1/1684* (2013.01); *G06F 3/03547* (2013.01); *G06F 3/0416* (2013.01); *G06F 3/0487* (2013.01); *G06F 3/04883* (2013.01); *G06F 2203/0339* (2013.01)

(58) Field of Classification Search
CPC .. G06F 3/0416; G06F 3/0487; G06F 3/03547; G06F 3/04883; G06F 1/1684; G06F 2203/0339

See application file for complete search history.

(56) References Cited

U.S. PATENT DOCUMENTS

| | | |
|---|---|---|
| 2003/0156099 A1 | 8/2003 | Yrjanainen et al. |
| 2008/0309631 A1* | 12/2008 | Westerman ........... G06F 1/3203 345/173 |
| 2009/0295753 A1 | 12/2009 | King et al. |

(Continued)

*Primary Examiner* — Premal Patel
(74) *Attorney, Agent, or Firm* — Lee, Hong, Degerman, Kang & Waimey PC

(57) ABSTRACT

A mobile terminal which includes a terminal body; a display mounted to the terminal body; a window disposed to cover the display and including central and edge regions wherein the central region is formed of a transmissive material and configured to align with the display, and the edge region is formed of an opaque material and configured to surround the central region. The mobile terminal further includes a first touch sensor disposed to span at least the central region and configured to detect a touch input to the central region; and a second touch sensor disposed to span at least part of the edge region and configured to detect a touch input to the at least part of the edge region, wherein the second touch sensor is configured to have a higher touch sensitivity than the first in order to detect a touch input to the opaque edge region.

18 Claims, 12 Drawing Sheets

(56) References Cited

U.S. PATENT DOCUMENTS

| | | | |
|---|---|---|---|
| 2010/0026656 A1* | 2/2010 | Hotelling | G06F 3/044 345/174 |
| 2011/0157046 A1* | 6/2011 | Lee | G04G 21/08 345/173 |
| 2012/0220341 A1* | 8/2012 | Sirpal | G06F 1/1616 455/566 |
| 2012/0262416 A1* | 10/2012 | Kitamura | G06F 1/3262 345/174 |
| 2012/0313865 A1* | 12/2012 | Pearce | G06F 3/0416 345/173 |
| 2013/0124242 A1* | 5/2013 | Burke | G06Q 10/101 705/7.12 |
| 2013/0307816 A1* | 11/2013 | Lee | G06F 1/1652 345/174 |

* cited by examiner

MOBILE TERMINAL

CROSS-REFERENCE TO RELATED APPLICATION

This application is a continuation of U.S. patent application Ser. No. 14/015,876, filed on Aug. 30, 2013, now U.S. Pat. No. 9,262,006, which claims the benefit of earlier filing date and right of priority to Korean Application No. 10-2013-0024073, filed on Mar. 6, 2013, the contents of which are all incorporated by reference herein in its entirety.

BACKGROUND OF THE INVENTION

1. Field of the Invention

The present invention relates to a mobile terminal, and particularly, to a mobile terminal having a touch sensor.

2. Background of the Invention

A mobile terminal is a device that can be carried around and has one or more functions such as to perform voice and video call communications, inputting and outputting information, storing data, and the like.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device.

Various attempts have been made to implement complicated functions in such a multimedia device by means of hardware or software. For instance, input by touch is being provided, in order to implement a convenient user interface (UI) with a simpler appearance.

In a case where an opaque edge region of a window, e.g., a touch key, is touched, touch sensitivity on the edge region is lower than that on a central region corresponding to a display. The reason is because the edge region has undergone a printing process for an opaque characteristic, or a light-shielding tape has been applied to the edge region, etc.

In the case of touching the edge region using a user's hand, the touch can be recognized because the hand has high electrostatic capacity. However, in case of touching the edge region using a stylus pen having low electrostatic capacity, the touch input may not be recognized.

In order to solve such problems, sensitivity of a touch sensor may be increased. However, in this case, touch sensitivity on the window corresponding to the central region becomes too high. This may cause a hovering phenomenon where touch input is detected before the window is touched.

SUMMARY OF THE INVENTION

Therefore, an aspect of the detailed description is to provide a mobile terminal having a touch structure capable of enhancing touch sensitivity on an edge region of a window.

Another aspect of the detailed description is to provide a new structure of a mobile terminal capable of utilizing an edge region of a window in various manners, and control methods thereof.

To achieve these and other advantages and in accordance with the purpose of this specification, as embodied and broadly described herein, there is provided a mobile terminal, comprising: a terminal body; a display mounted to the terminal body, and configured to output visual information; a window disposed to cover the display, and divided into a central region formed of a transmissive material in correspondence to the display, and an edge region formed of an opaque material and enclosing the central region; a first touch sensor disposed to cover the central region, and configured to sense touch input to the central region of the window; and a second touch sensor disposed to cover at least part of the edge region, configured to sense touch input to the edge region of the window, and having higher touch sensitivity than the first touch sensor in order to overcome lowering of touch recognition due to an opaque characteristic of the edge region.

According to an embodiment of the present invention, the first touch sensor may be disposed, on the edge region, so as to overlap at least part of the second touch sensor. And the second touch sensor may be disposed between the window and the first touch sensor.

According to another embodiment of the present invention, the second touch sensor may comprise a first touch sensing portion disposed at one side of the terminal body in a lengthwise direction; and a second touch sensing portion extending from the first touch sensing portion in a bending manner, disposed at one side of the terminal body in a widthwise direction, and extending from the first touch sensing portion in a lengthwise direction of the terminal body.

The first touch sensing portion may be formed in a widthwise direction of the terminal body. The mobile terminal may further comprise a memory configured to record touch input according to an output time of corresponding visual information, upon detection of touch input to the window corresponding to the first touch sensing portion, while moving images are being reproduced on the display.

The second touch sensing portion may be configured to sense continuous touch input in a lengthwise direction of the terminal body.

The mobile terminal may further comprise a controller configured to change visual information output to the display, upon detection of continuous touch input to the second touch sensing portion in a lengthwise direction of the terminal body.

The mobile terminal may further comprise a memory configured to capture and store visual information output to the display, upon detection of continuous touch input to the second touch sensing portion in a lengthwise direction of the terminal body.

The second touch sensor may further comprise a third touch sensing portion extending from the first touch sensing portion in a bending manner, disposed at another side of the terminal body in a widthwise direction, and extending from the first touch sensing portion in a lengthwise direction of the terminal body.

The mobile terminal may further comprise a controller configured to convert a deactivated state of the display into an activated state, upon detection of touch input to the window corresponding to the second touch sensing portion and the third touch sensing portion, while the display is in the deactivated state.

The mobile terminal may further comprise a controller configured to change visual information output to the display, upon detection of continuous proximity touch input from one region to another region of the window, in correspondence to the second touch sensing portion and the third touch sensing portion.

According to another embodiment of the present invention, the mobile terminal may further comprise a touch input unit detachably mounted to the terminal body, and configured to allow touch input to the window corresponding to the first touch sensor and the second touch sensor; and a controller configured to deactivate the second touch sensor, upon detection of touch input, by the touch input unit, to the window corresponding to the first touch sensor.

According to still another embodiment of the present invention, the window may be provided with a planar portion, and a curved portion extending from the planar portion. The display may be configured to output different visual information to the planar portion and the curved portion. The second touch sensor may be provided with a curved surface touch sensing portion configured to sense touch input to an edge region of the curved portion.

The mobile terminal may further comprise a controller configured to change visual information output to the planar portion and/or the curved portion, upon detection of continuous touch input to the curved surface touch sensing portion in a lengthwise direction or widthwise direction of the terminal body.

The mobile terminal may further comprise a controller configured to convert a deactivated state of the display into an activated state, upon detection of multi-touch input to the curved surface touch sensing portion, while the display is in the deactivated state.

The mobile terminal may further comprise a memory configured to capture and store visual information output to the planar portion and/or the curved portion, upon detection of continuous touch input to the curved surface touch sensing portion in a lengthwise direction of the terminal body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. A singular expression used in the present invention includes a plural meaning unless it is obviously defined. The suffixes attached to components, such as 'module' and 'unit or portion' were used for facilitation of the detailed description of the present invention. Therefore, the suffixes do not have different meanings from each other.

The mobile terminal according to the present invention may include a portable phone, a smart phone, a laptop computer, a digital broadcasting terminal, Personal Digital Assistants (PDA), Portable Multimedia Player (PMP), an E-book, a navigation system, etc. However, it will be obvious to those skilled in the art that the present invention may be also applicable to a fixed terminal such as a digital TV and a desktop computer.

Figure 1:
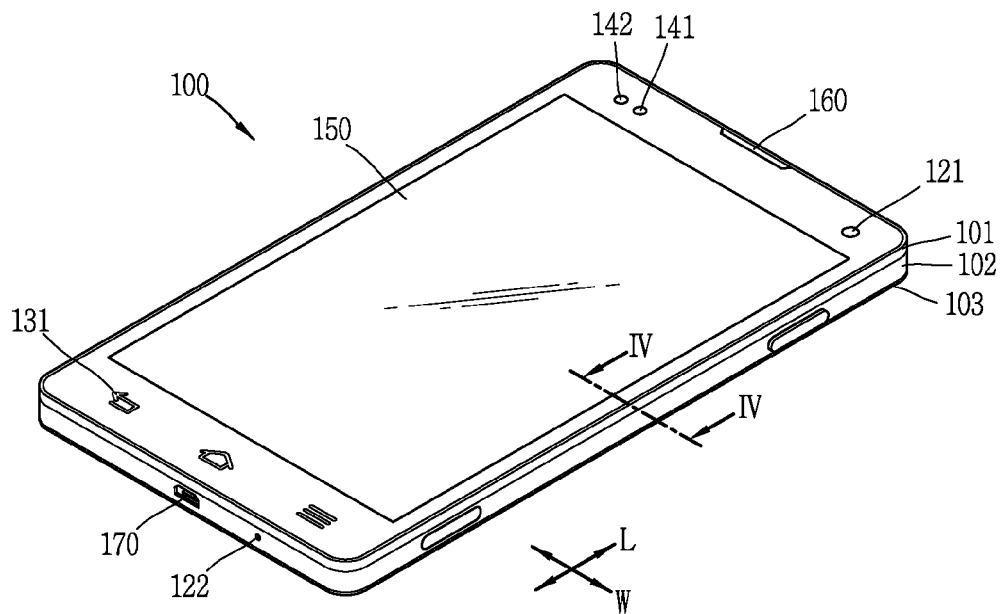
FIG. 1 is a front perspective view of a mobile terminal according to an embodiment of the present invention.

FIG. 1 is a front perspective view of a mobile terminal 100 according to the present invention.

Referring to FIG. 1, the mobile terminal 100 according to the present invention is a bar type mobile terminal. However, the present invention is not limited to this, but may be applied to a watch type, a clip type, a glasses type, a folder type in which two or more bodies are coupled to each other so as to perform a relative motion, a swing type, a swivel type, etc.

A case (casing, housing, cover, etc.) forming an appearance of a terminal body may include a front case 101 and a rear case 102. Various components may be accommodated in a space formed by the front case 101 and the rear case 102. A cover 103 may be coupled to the front case 101 or the rear case 102 to thus form a rear appearance of the mobile terminal 100.

Such cases may be formed by injection-molded synthetic resin, or may be formed using a metallic material such as stainless steel (STS), titanium (Ti) and aluminum (Al).

A display unit 150, a proximity sensor 141, an illumination sensor 142, a to first audio output unit 160, a first camera 121, a first manipulation unit 131, etc. may be formed on the front surface of the terminal body. A microphone 122, an interface unit 170, a second manipulation unit 132, etc. may be formed on the side surface of the terminal body.

The display unit 150 is configured to display (output) information processed by the mobile terminal 100. The display unit 150 may include a liquid crystal display (LCD) module, a thin film transistor-liquid crystal display (TFT LCD), an organic light-emitting diode (OLED), a flexible display, a three-dimensional (3D) display and an e-ink display.

The display unit 150 may include a touch sensing means for sensing content input in a touch manner. Once a region on the display unit 150 is touched, content corresponding to the touched region is input. Content input in a touch manner may be texts, or numbers, or menu items which can be instructed or set in each mode.

The touch sensing means may be formed to be transmissive so that the display unit 150 can be viewed, and may include a structure for enhancing visibility of the display unit 150 in a bright environment. Referring to FIG. 1, the display unit 150 occupies most parts of the front surface of the front case 101.

The proximity sensor 141, the illumination sensor 142, the first audio output unit 160 and the first camera 121 are disposed at a region close to one end of the display unit 150, and the first manipulation unit 131 and the microphone 122 are disposed at a region close to another end of the display unit 150. The second manipulation unit 132 (refer to FIG. 2), an interface unit 170, etc. may be disposed on the side surface of the terminal body.

The proximity sensor 141 is configured to detect whether an object is disposed at a prescribed region, and may be used to control other components including the display unit 150. For instance, the proximity sensor 141 is disposed close to the display unit 150, and may deactivate the display unit 150 when a user's face comes in contact with the terminal body for calling.

The illumination sensor 142 is configured to sense brightness of light around the terminal body. The mobile terminal 100 may be configured to automatically control illumination of the display unit 150, using the illumination sensor 142, according to the amount of peripheral light.

The first audio output unit 160 may be implemented as a receiver for transmitting a call sound to a user's ears, or a loud speaker for outputting each type of alarm sounds or a play sound of multimedia.

A sound generated from the first audio output unit 160 may be emitted along an assembly gap between structures. In this case, a hole for output of a sound may not be exposed to the exterior, and thus the appearance of the mobile terminal 100 may be simplified.

The first camera 121 processes image data of still pictures or video acquired by an image capture device in a video capturing mode or an image capturing mode. The processed image frames may be displayed on the display unit 150.

The user input unit is manipulated to input a command for controlling the operation of the mobile terminal 100, and may include a first manipulation unit 131 and a second manipulation unit 132. The first manipulation unit 131 and the second manipulation unit 132 may be referred to as manipulating portions, and may include any types that can be manipulated in tactile manner.

In FIG. 1, the first manipulation unit 131 is implemented as a touch key. However, the present invention is not limited to this. For instance, the first manipulation unit 131 may be implemented as a mechanical key, or combination of a touch key and a mechanical key.

Content input by the first manipulation unit 131 and/or the second manipulation unit 132 may be set in various manners. For instance, the first manipulation unit 131 may be used to input commands such as menu, home, cancel and search. The second manipulation unit 132 may be used to input a command such as controlling a size of a sound output from the first audio output module 160, or a command such as converting the current mode of the display unit 150 to a touch recognition mode.

The microphone 122 is configured to receive a user's voice or other sounds. The microphone 122 may be provided at a plurality of positions, and may be configured to receive a stereo sound.

The interface unit 170 may be generally implemented to interface the mobile terminal 100 with external devices. For example, the interface unit 170 may include at least one connection terminal for wired or wireless connection with an earphone, a port for short-range communication (e.g., Infrared ray port (IrDA Port), Bluetooth port, wireless LAN port, etc.), and a power supply terminal for supplying power to the mobile terminal 100. Such interface unit 170 may be implemented as a socket for accommodating therein an external card such as a Subscriber Identity Module (SIM), a User Identity Module (UIM), and a memory card for information storage.

Figure 2:
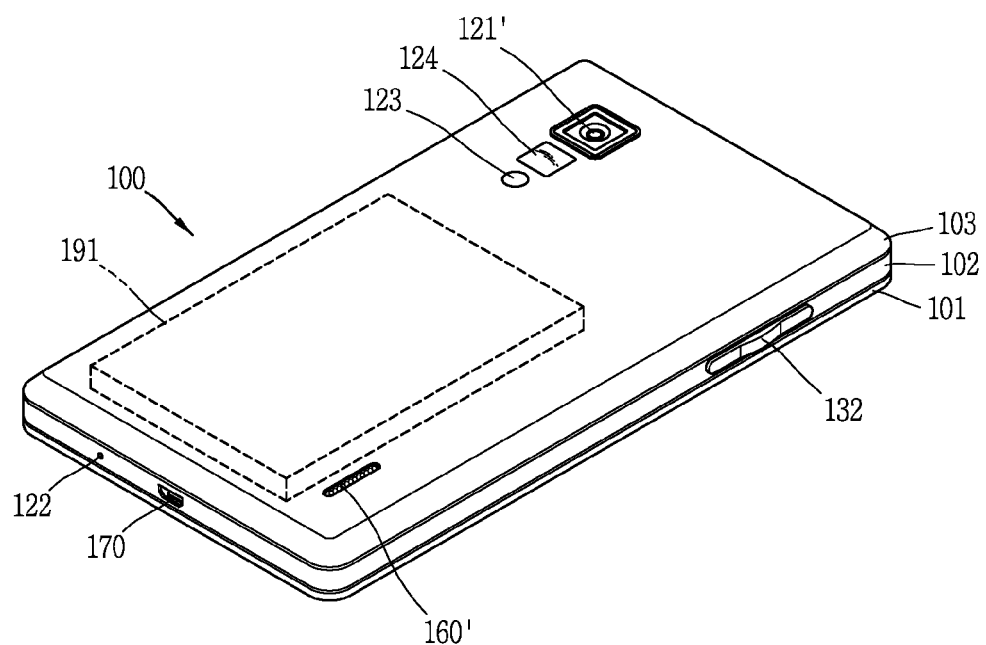
FIG. 2 is a rear perspective view of the mobile terminal of FIG. 1.

FIG. 2 is a rear perspective view of the mobile terminal 100 of FIG. 1.

Referring to FIG. 2, a second camera 121' may be additionally mounted to the rear surface of the terminal body. The second camera 121' faces a direction which is opposite to a direction faced by the first camera 121 (refer to FIG. 1), and may have pixels different from those of the first camera 121.

For example, the first camera 121 may operate with relatively lower pixels (lower resolution). Thus, the first camera 121 may be useful when a user is capturing his or her face and sending it to a calling party in a video call mode or the like. On the other hand, the second camera 121' may operate with relatively higher pixels (higher resolution) such that it can be useful for a user to obtain higher quality pictures for later use.

A flash 123 and a mirror 124 may be additionally disposed close to the second camera 121'. When capturing an object by using the second camera 121', the flash 123 provides light to the object. The mirror 124 can cooperate with the second camera 121' to allow a user to photograph himself or herself in a self-portait mode.

A second audio output unit 160' may be additionally disposed on the rear surface of the terminal body. The second audio output module 160' may implement a stereo function together with the first audio output module 160 (refer to FIG. 1), and may be used for calling in a speaker phone mode.

A broadcast signal receiving antenna, as well as an antenna for calling (not shown) may be additionally disposed on the side surface of the terminal body. An antenna, part of a broadcast receiving module, may be installed to be retractable into the terminal body.

The power supply unit for supplying power to the mobile terminal 100 is mounted to the terminal body. The power supply unit may be implemented as a battery 191 mounted in the terminal body or detachably mounted to the terminal body.

Figure 3:
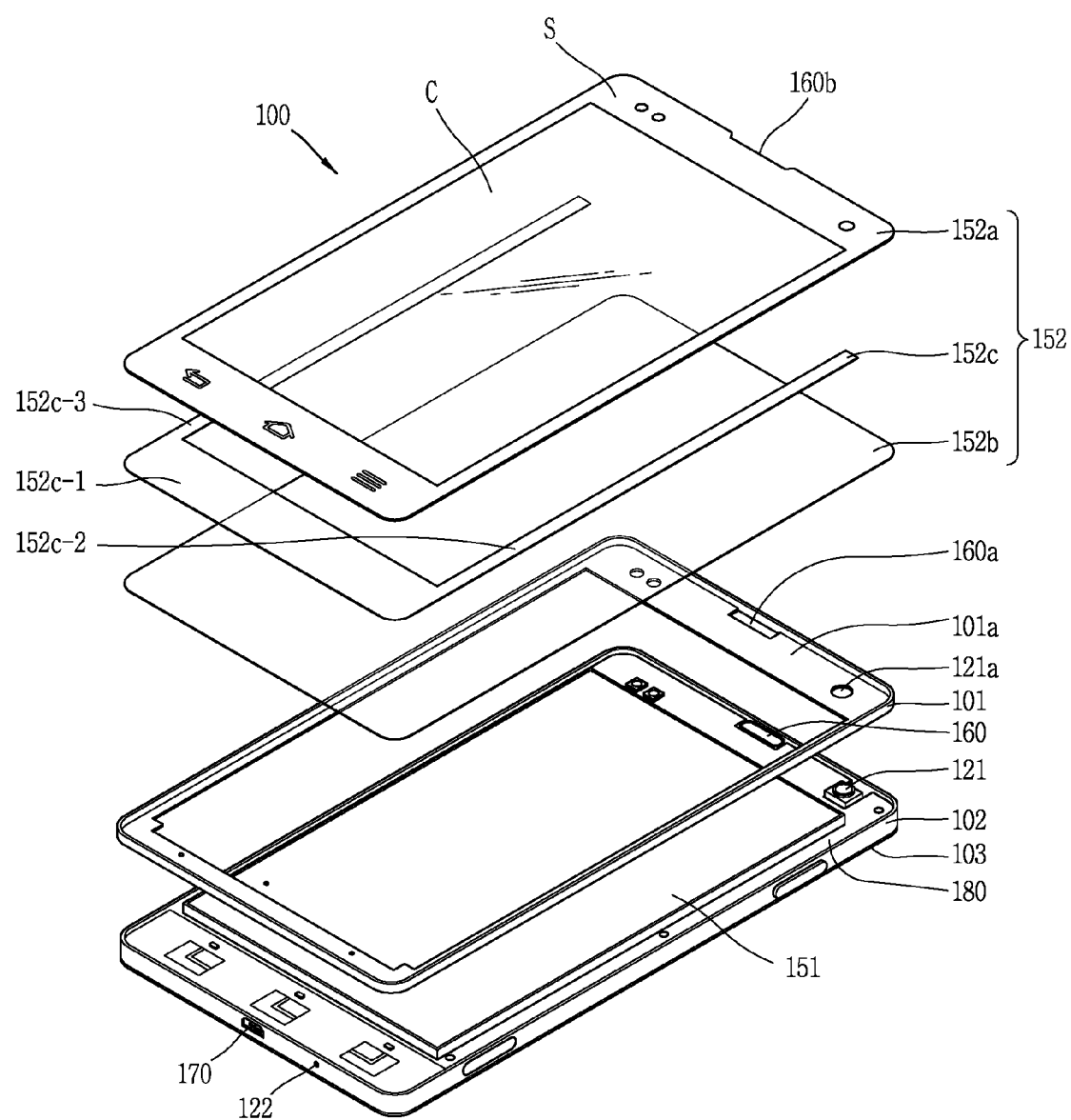
FIG. 3 is an exploded perspective view of the mobile terminal of FIG. 1.
Figure 4:
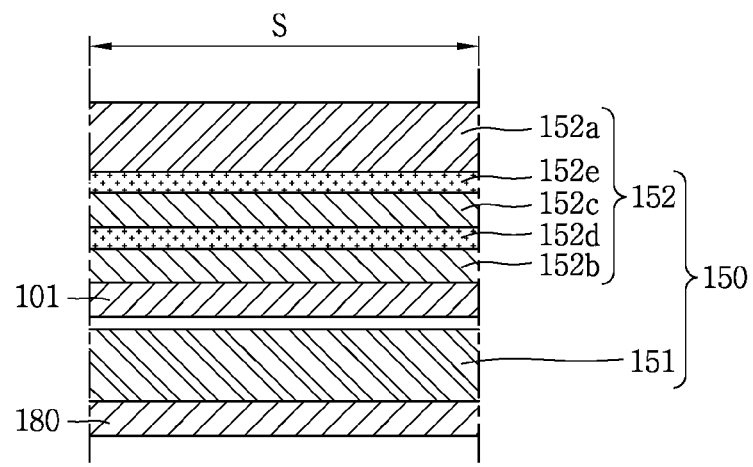
FIG. 4 is a sectional view taken along line 'IV-IV' in FIG. 1.

FIG. 3 is an exploded perspective view of the mobile terminal 100 of FIG. 1, and FIG. 4 is a sectional view taken along line 'IV-IV' in FIG. 1.

Referring to FIG. 3, a circuit board 180 is disposed in the terminal body. The circuit board 180 may be mounted at the rear case 102, or may be installed at an additional inner structure. The circuit board 180 may be configured as an example of the controller for executing various types of functions of the mobile terminal 100. As shown, the first audio output unit 160, the first camera 121, etc. may be mounted to the circuit board 180.

A display unit 150 (refer to FIG. 1), which is configured to display information processed by the mobile terminal 100, is disposed on one surface of the terminal body. The display unit 150 may be arranged to occupy most parts of the front surface of the terminal body. The display unit 150 includes a display 151, and a window unit 152 disposed to cover the display 151.

The mobile terminal 100 is provided with a frame which accommodates therein the display 151. In this embodiment, the frame is implemented as the front case 101 which forms the appearance of the terminal body. However, the frame may be implemented as an additional inner structure different from the front case 101.

A mounting portion 101*a* may be formed at the front case 101. The mounting portion 101*a* is recessed from one surface of the front case 101, thereby forming a space where the window unit 152 is mounted. A hole 121*a* corresponding to the first camera 121, and a sound hole 160*a* corresponding to the first sound output portion 16., are formed at the mounting portion 101*a*. The sound hole 160*a* may be disposed close to a side wall of the front case 101.

The window unit 152 is mounted to the mounting portion 101*a*. A transmissive region of the window unit 152 may have an area corresponding to the display 151. Under such configuration, a user can recognize, from outside, visual information output from the display 151.

A groove 160*b* may be formed on a side surface of the window unit 152 such that the side surface forms an assembly gap with a facing side wall of the front case 101. Under such configuration, a sound generated from the first audio output unit 160 is emitted along the assembly gap between the front case 101 and the window unit 152. As the hole for output of a sound is not exposed to outside of the mobile terminal, the appearance of the mobile terminal 100 may be simpler.

The display 151 is arranged on the rear surface of the window unit 152, and constitutes the display unit 150 together with the window unit 152 by being accommodated in the front case 101. The display 151 is electrically connected to the circuit board 180, and is configured to output visual information under control of the controller. The display 151 may have an area corresponding to the transmissive region of the window unit 152.

The display 151 may be implemented as one of a liquid crystal display (LCD), a thin film transistor-liquid crystal display (TFT-LCD), an organic light-emitting diode (OLED), a flexible display, or a three-dimensional display (3D display).

As shown, the window unit 152 may include a transmissive window 152*a*; and a first touch sensor 152*b* and a second touch sensor 152*c* disposed on one surface of the window 152*a* for sensing touch input to the window 152*a*.

The window 152*a* may be formed of a transmissive material, e.g., transmissive resin, reinforcing glass, etc. The window 152*a* may be formed to include an opaque region.

The window 152*a* is divided into an edge region (S) formed of an opaque material, and a central region (C) enclosed by the edge region (S). The edge region (S) is mounted to the mounting portion 101*a* for support, and the central region (C) may have an area corresponding to the display 151.

The first touch sensor 152*b* and the second touch sensor 152*c* are configured to convert change of a voltage, a charging amount, etc. occurring from a specific part of the window 152*a*, into an electric input signal. Each of the first touch sensor 152*b* and the second touch sensor 152*c* may be provided with a conductive pattern formed as a conductive material deposited or printed onto the window 152*a* or an additional film. The conductive material may be ITO(Indium Tin Oxide), CNT(Carbon Nano Tube), conductive polymer, In2O3, SnO2, Au, etc.

The first touch sensor 152*b* is disposed to cover the central region (C) so as to sense touch input to the central region (C) of the window 152*a*. In FIG. 3, the first touch sensor 152*b* is illustrated as a single layer. The first touch sensor 152*b* may be implemented as not only a GFF type using two sheets of conductive films and a G1F1 type, but also a G2 type. The G1F type is implemented by depositing a conductive pattern onto the rear surface of the window 152*a*, and by forming a conductive film on the conductive pattern. The G2 type is implemented by depositing a conductive pattern onto the rear surface of the window 152*a*. The first touch sensor 152*b* is formed of a transmissive material so that an image formed on the display 151 can be transmissive. A region of the first touch sensor 152*b*, which corresponds to a transmissive region of the window 152*a*, forms an input region.

The second touch sensor 152*c* is disposed to cover at least part of the edge region (S), and is configured to sense touch input to the edge region (S) of to the window 152*a*. In FIG. 3, the second touch sensor 152*c* is formed to have a rectangular shape with one open end, and is disposed to enclose right and left sides and a lower end of the display 151. The second touch sensor 152*c* is set to have a higher touch sensitivity than the first touch sensor 152*b*, and is configured to prevent lowering of touch recognition resulting from an opaque characteristic of the edge region (S).

The first touch sensor 152*b* and the second touch sensor 152*c* may be electrically connected to the circuit board 180 through different flexible printed circuit boards (FPCBs, not shown). Such FPCBs are preferably arranged to prevent physical interference therebetween. For instance, the FPCB connected to the first touch sensor 152*b* may be disposed at the upper end of the terminal body, whereas the FPCB connected to the second touch sensor 152*c* may be disposed at the lower end of the terminal body.

Referring to FIG. 4 illustrating a section of the edge region (S), the second touch sensor 152*c* is disposed on the first touch sensor 152*b*, and the window 152*a* is disposed on the second touch sensor 152*c*. More specifically, on the edge region (S), the first touch sensor 152*b* is disposed to overlap at least part of the second touch sensor 152*c*, and the second touch sensor 152*c* is disposed between the window 152*a* and the first touch sensor 152*b*.

Under such configuration, the second touch sensor 152*c* is disposed closer to the window 152*a* than the first touch sensor 152*b*, to compensate for the lowering of touch recognition sensitivity resulting from an opaque characteristic of the edge region (S). Accordingly, in a case where the edge region (S) is touched using the touch input unit 133 (refer to FIG. 5), touch input can be smoothly performed, and touch sensitivities on the central region (C) and the edge region (S) can be set to be similar to each other.

The first touch sensor 152*b* and the second touch sensor 152*c* may be implemented in the form of a film, and may be attached to the rear surface of the window 152*a*. An adhesive layer 152*d* may be disposed between the first touch sensor 152*b* and the second touch sensor 152*c*, and an adhesive layer 152*e* may be disposed between the window 152*a* and the first touch sensor 152*b*. For the adhesive layers 152*d* and 152*e*, an OCA (Optical Clear Adhesive), an SVR (Super View Resin), etc. may be used.

The display 151 and the window unit 152 may constitute the display unit 150, and may be modularized as a single assembly. In a case where the window unit 152 includes the first touch sensor 152*b* and the second touch sensor 152*c*, the display unit 150 operates as a touch screen.

Referring back to FIG. 3, the second touch sensor 152*c* includes a first touch sensing portion 152*c*-1 and a second touch sensing portion 152*c*-2. The first touch sensing portion 152*c*-1 is disposed at one side of the terminal body in a lengthwise direction (L, refer to FIG. 1). For instance, the first touch sensing portion 152*c*-2 may be provided with a conductive pattern corresponding to the first manipulation unit 131, for detection of touch input by the first manipulation unit 131.

The second touch sensing portion 152c-2 extends from the first touch sensing portion 152c-1 in an angled manner, and is disposed at one side of the terminal body in a widthwise direction (W, refer to FIG. 1). And the second touch sensing portion 152c-2 is formed in the lengthwise direction (L) of the terminal body. A region on the window 152a corresponding to the second touch sensing portion 152c-2 is a bezel portion on right and left side surfaces of the display unit 150, which is configured not to be touched. However, the present invention proposes various user interfaces using a structure where the second touch sensing portion 152c-2 is disposed at the bezel portion. The second touch sensing portion 152c-2 may be configured to sense continuous touch input in the lengthwise direction (L) of the terminal body.

Hereinafter, a method for controlling the mobile terminal 100 using the second touch sensor 152c in various manners, will be explained in more detail with reference to FIGS. 5 to 10.

Figure 5:
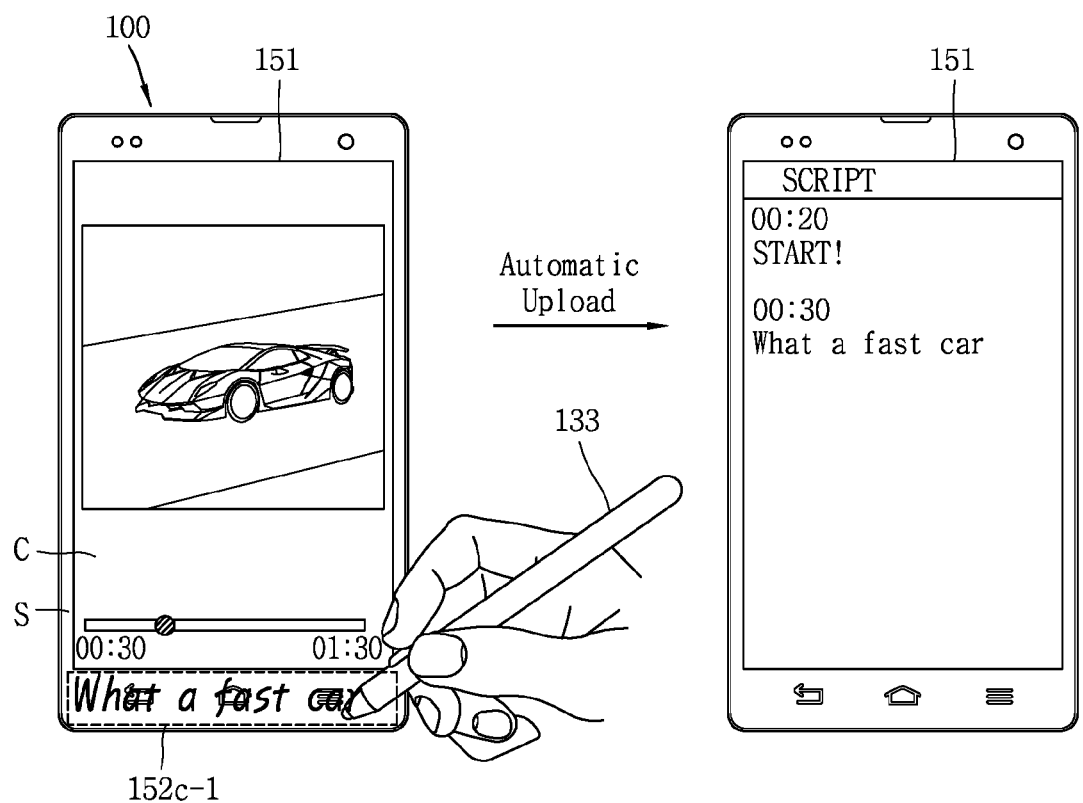
FIGS. 5 to 10 are conceptual views illustrating various methods for controlling a mobile terminal using a second touch sensor of FIG. 3.

Referring to FIG. 5, a prescribed writable region is positioned at the lower end of the edge region (S) of the terminal body. The first touch sensing portion 152c-1 is disposed within the prescribed region, and extends in the widthwise direction (W) of the terminal body.

Upon detection of touch input to the window corresponding to the first touch sensing portion 152c-1, while moving images are being reproduced on the display 151, a memory records touch inputs (images of touch inputs) according to an output time of the corresponding visual information.

For instance, if a user writes, on the prescribed region, dialogue included in a scene while viewing a movie, the memory stores an additional subtitle file containing the dialogue. The user may check whether the written text is the same as the dialogue. This may be used in dictation when studying a foreign language.

Figure 6:
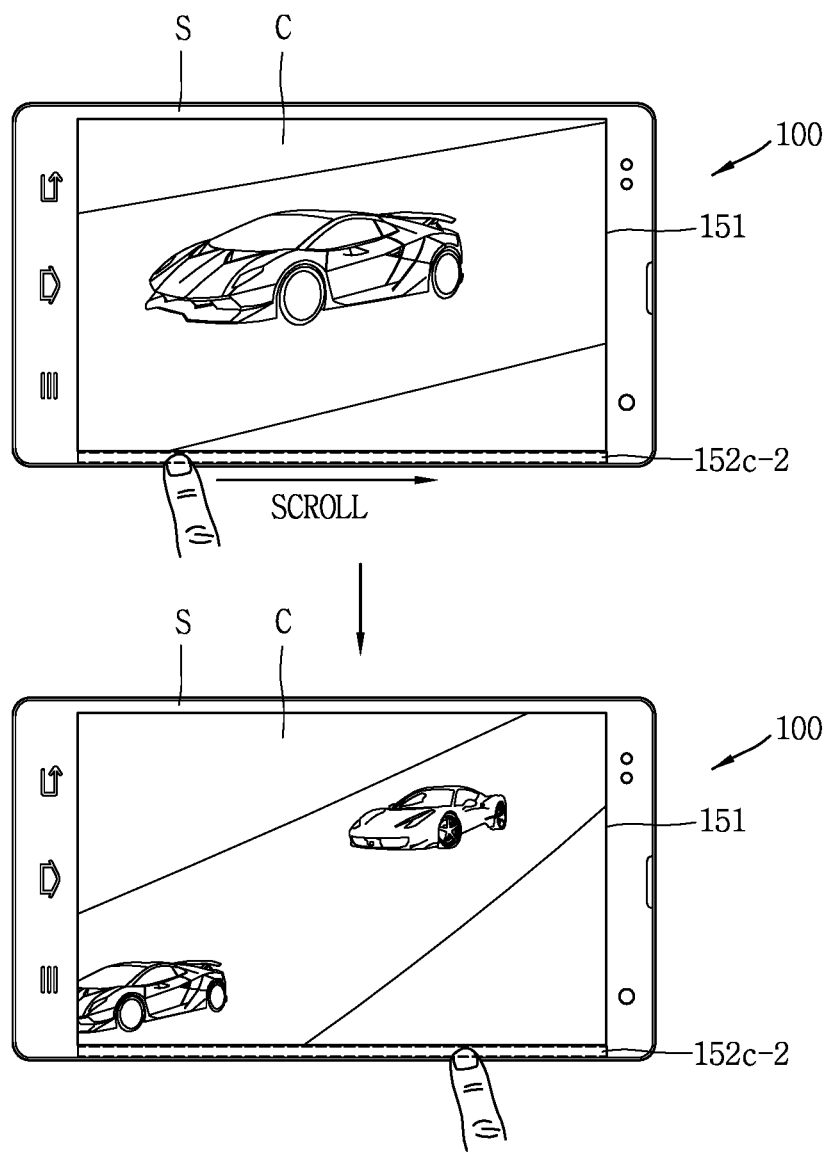

Referring to FIG. 6, the second touch sensing portion 152c-2 may be configured to sense continuous touch input in the lengthwise direction (L) of the terminal body. Upon detection of continuous touch input to the second touch sensing portion 152c-2 in the lengthwise direction (L) of the terminal body, the controller controls visual information output from the display 151 to be changed.

For instance, if one point on the edge region (S) corresponding to the second touch sensing portion 152c-2 is touched and scrolled to a second point (i.e., continuous touch occurs) while moving images are being reproduced, the current moving image may be moved forwardly or backwardly so that a scene corresponding to the second point can be reproduced. This may be applicable to an operation to view photos in flipping manner, or an operation to scroll a message, or an application.

Figure 7:
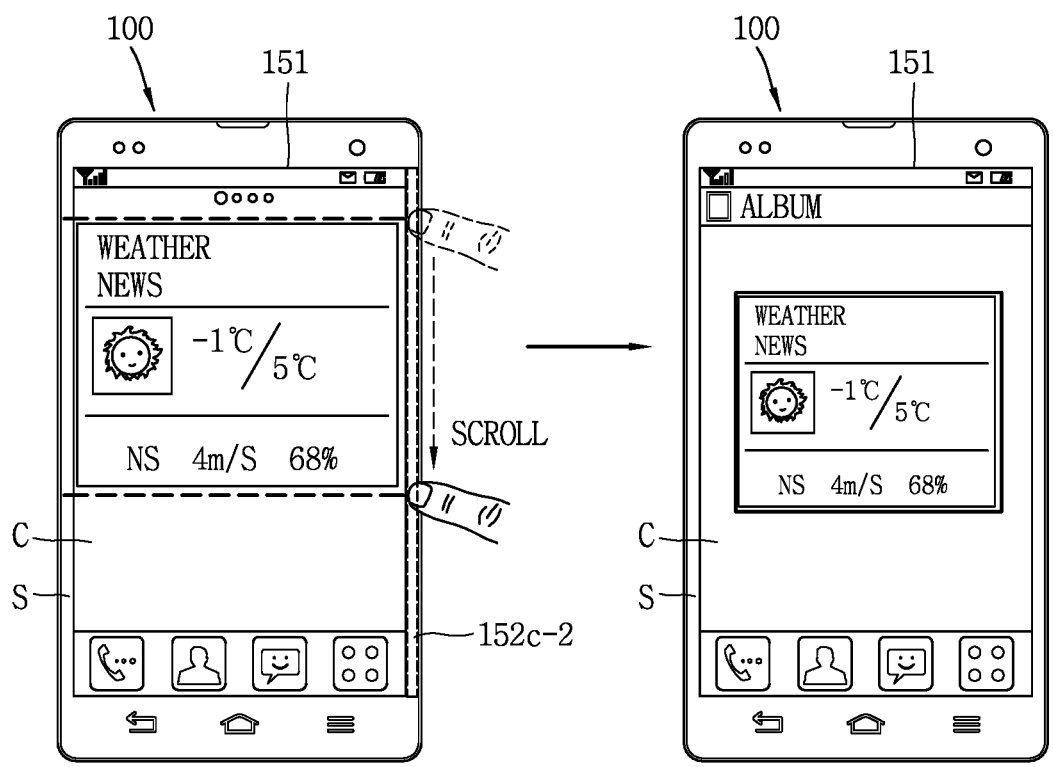

Referring to FIG. 7, upon detection of a continuous touch input to the second touch sensing portion 152c-2 in the lengthwise direction (L) of the terminal body, the memory may capture and store visual information output from the display 151.

For instance, in a case where the upper end of the edge region (S) corresponding to the second touch sensing portion 152c-2 is continuously touched (scrolled) to the lower end, the memory may capture a screen shot output to the display 151. The screen shot captured during the scroll operation may be provided with a visual effect (e.g., formation of scanning line) in the scrolling direction.

Referring back to FIG. 3, the second touch sensor 152c may further comprise a third touch sensing portion 152c-3 extending from the first touch sensing portion 152c-1 in an angled manner, disposed at another side of the terminal body in the widthwise direction (W), and extending from the first touch sensing portion 152c-1 in the lengthwise direction (L) of the terminal body. That is, the second touch sensing portion 152c-2 and the third touch sensing portion 152c-3 may be disposed at a left bezel portion and a right bezel portion based on the central region (C). The third touch sensing portion 152c-3 may be also configured to sense continuous touch input in the lengthwise direction (L) of the terminal body.

Figure 8:
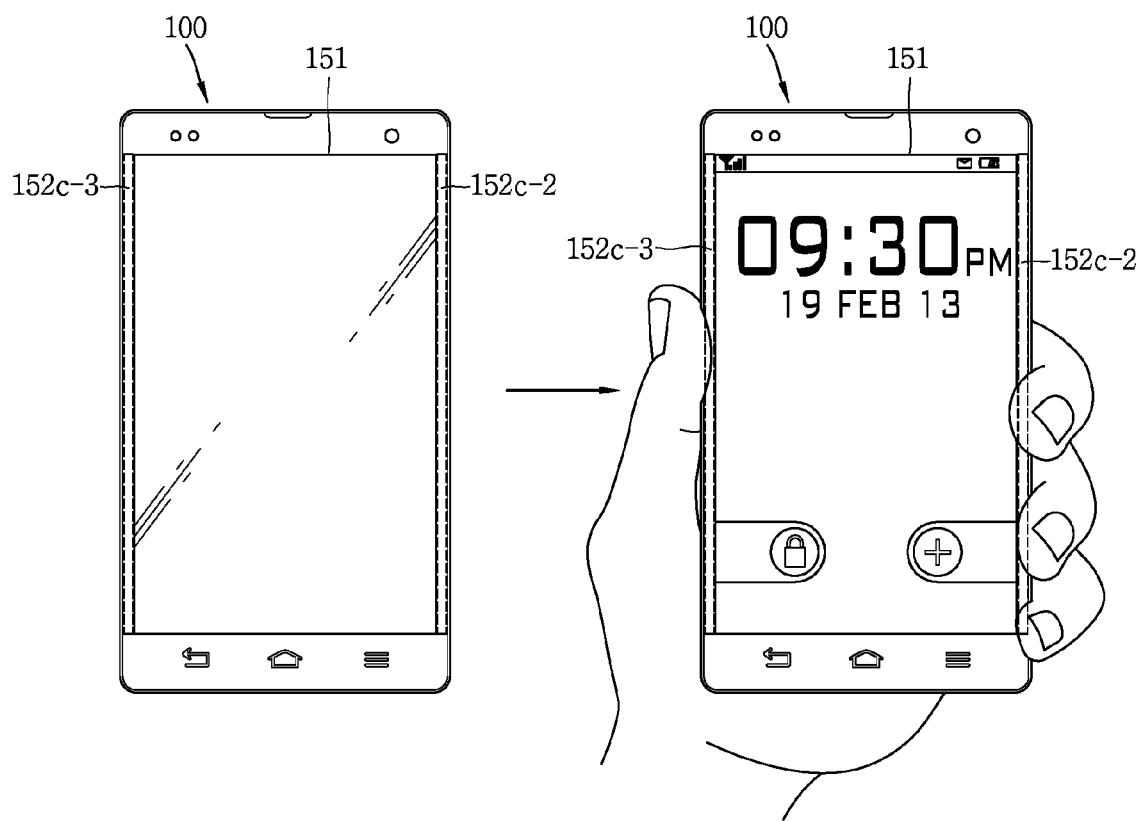

Referring to FIG. 8, upon detection of a touch input by the second touch sensing portion 152c-2 and the third touch sensing portion 152c-3 when the display 151 is in an inactivated state, the controller may convert the inactivated state of the display 151 into an activated state.

Touch input for activation of the display 151 may be set in various manners. For instance, upon detection of multi-touch input to the second touch sensing portion 152c-2 or the third touch sensing portion 152c-3, the controller may convert an inactivated state of the display 151 into an activated state. As another example, when a motion of the mobile terminal is detected by an acceleration sensor, a gyro sensor, etc., the controller may convert an inactivated state of the display 151 into an activated state.

Figure 9:
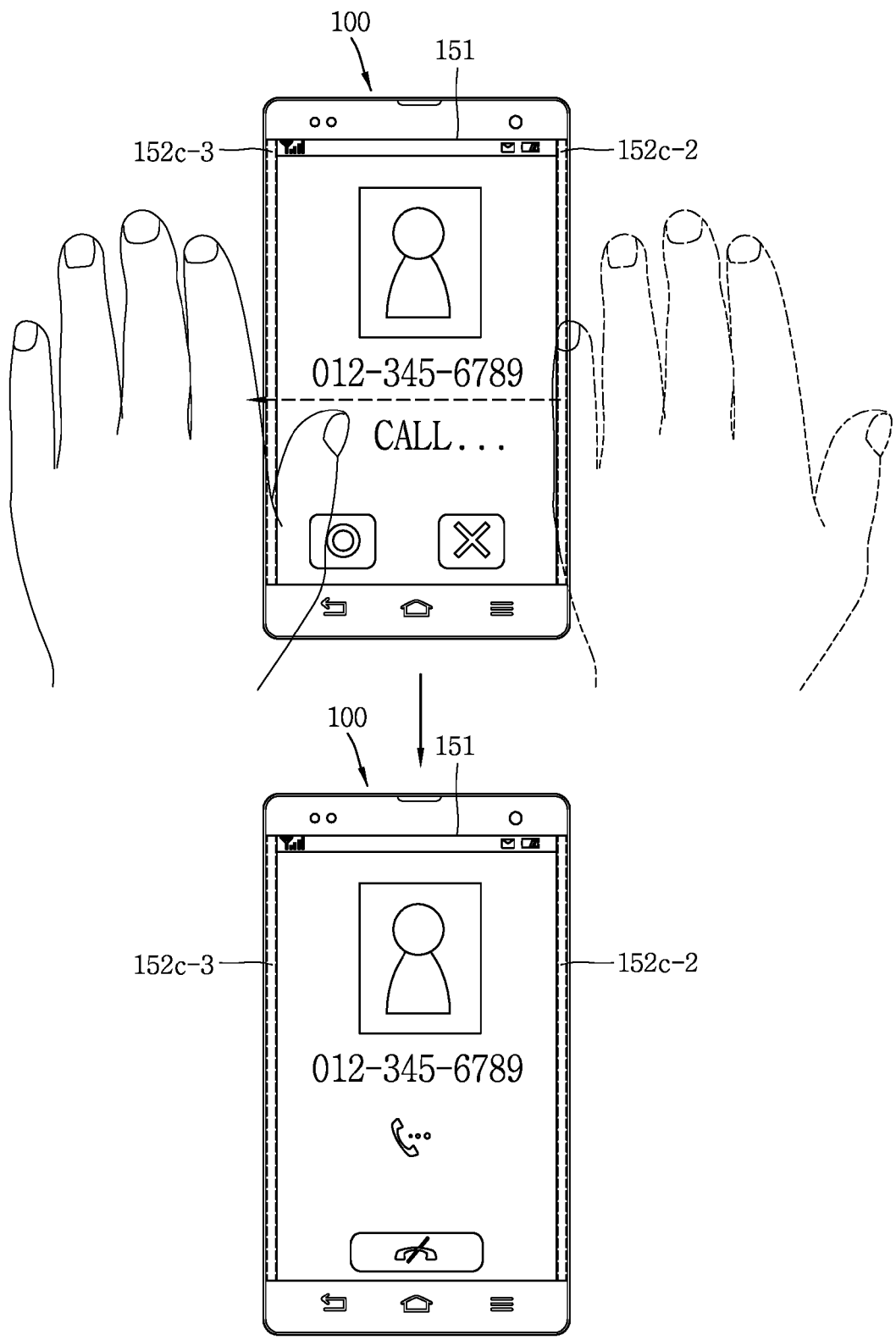

Referring to FIG. 9, in a case where touch sensitivity on the window 152a corresponding to the second touch sensing portion 152c-2 and the third touch sensing portion 152c-3 is increased, touch may be sensed if a user's hand approaches the window 152a within a prescribed distance, even if the user does not directly touch the window 152a. Under such configuration, upon detection of a continuous proximate touch input from one region to another region of the window 152a, in correspondence to the second touch sensing portion 152c-2 and the third touch sensing portion 152c-3, the controller may change visual information output from the display 151.

For instance, if a user's hand moves from right to left by a prescribed distance from the window 152a when a call is incoming, the controller may change the current mode into a call mode, by recognizing the proximate touch from the second touch sensing portion 152c-2 to the third touch sensing portion 152c-3. This may be applicable to a manipulating operation with respect to the mobile terminal (e.g., scrolling a photo, a message, an application, a selectable list, a text, etc., activating/deactivating the display 151, and so on) in a situation where a user has difficulty in directly touching the window 152a.

Figure 10:
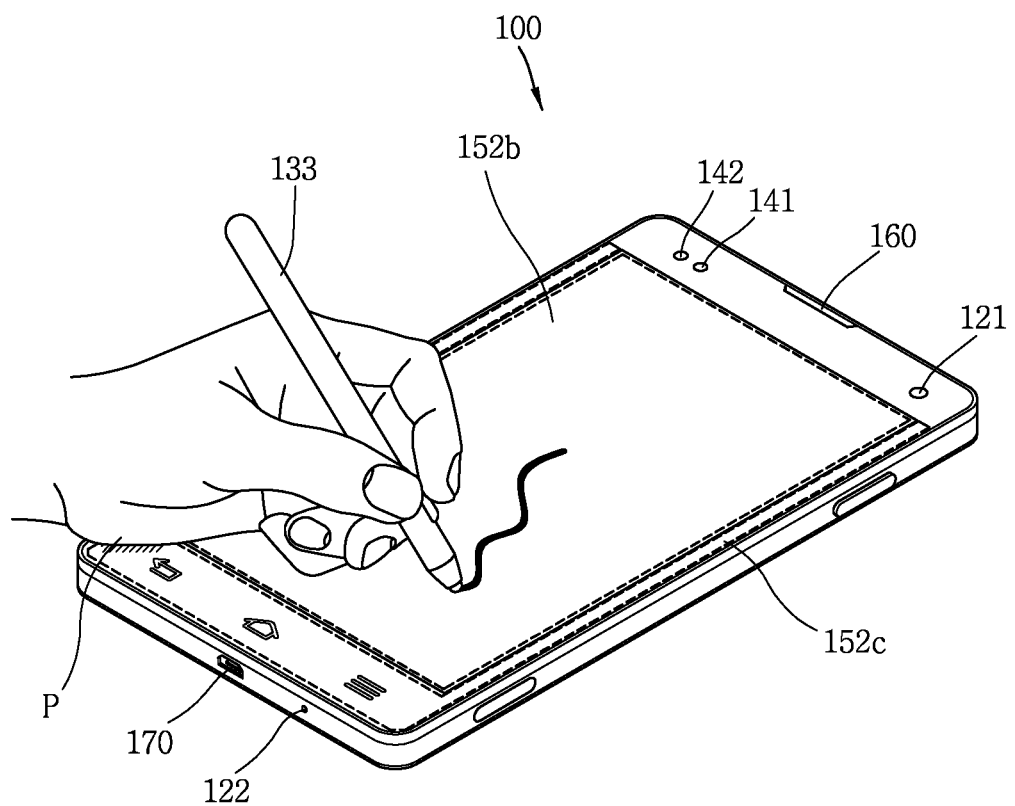

Referring to FIG. 10, the touch input unit 133 is detachably mounted to the terminal body. The touch input unit 133 is configured to touch the first touch sensor 152b and the second touch sensor 152c. Upon detection of a touch input by the touch input unit 133 to the window corresponding to the first touch sensor 152b, the controller may deactivate the second touch sensor 152c, or may lower the touch sensitivity of the second touch sensor 152c.

For instance, if the user's hand is above the terminal body for implementing a free touch using a pen type stylus, while a memo function is being executed, the user's palm (P) may come in contact with a part of the window 152a corresponding to the first touch sensor 152b. This may cause an undesired operation (palm rejection). To prevent this, the second touch sensor 152c, which operates in a separate manner from the first touch sensor 152b, may be deactivated. This may result in free touch like a writing operation on paper.

Figure 11:
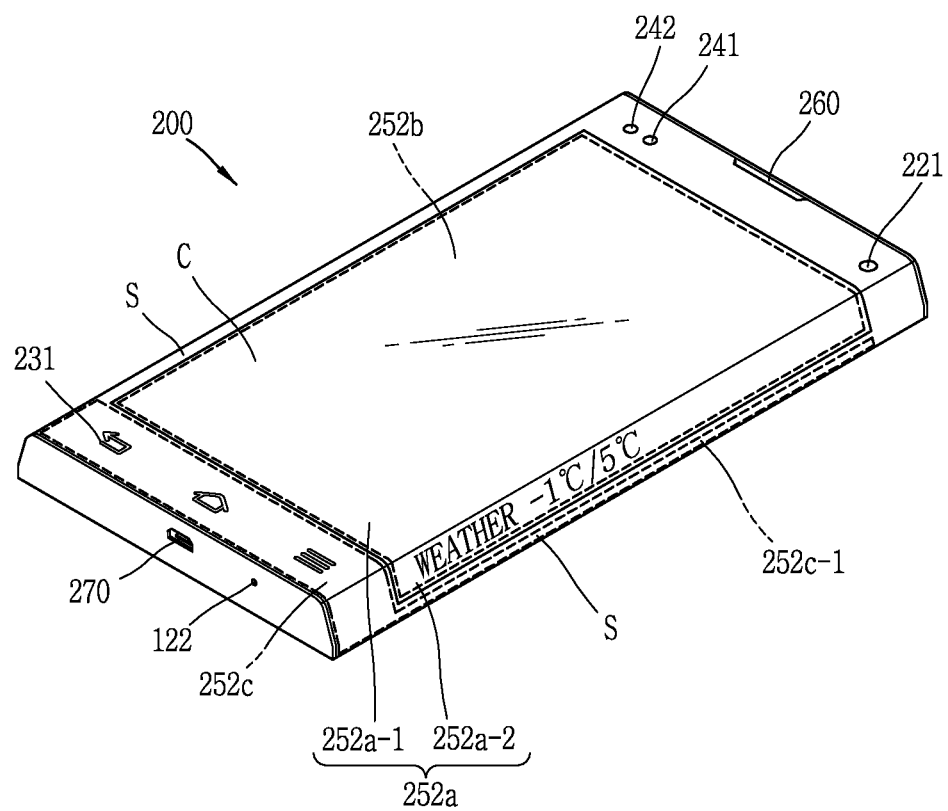
FIG. 11 is a front perspective view of a mobile terminal according to another embodiment of the present invention.

FIG. 11 is a front perspective view of a mobile terminal 200 according to another embodiment of the present invention. The same or similar component as to the aforementioned embodiment will be provided with the same or similar reference numerals, and explanations thereof will be omitted.

Referring to FIG. 11, a window 252a is provided with a planar portion 252a-1, and a curved portion 252a-2 extending from the planar portion 252a-1. In FIG. 11 of the embodiment of the present invention, the planar portion 252a-1 and the curved portion 252a-2 of the window 252a are disposed on a front surface and a side surface of a terminal body, respectively. A central region (C), formed of a transmissive material and configured to output visual information, is set to include part of the planar portion 252a-1 and the curved portion 252a-2. An edge region (S), formed of an opaque material, is configured to enclose the central region (C).

A display 251 (refer to FIG. 13) is configured to output different visual information to the planar portion 252a-1 and the curved portion 252a-2. Under such configuration, a user can recognize visual information output to the planar portion 252a-1 while viewing the front surface of the mobile terminal 200. Also, a user can recognize visual information output to the curved portion 252a-2 while viewing the side surface of the mobile terminal 200. The display 251 may be implemented as a curved-type flexible display, in correspondence to the planar portion 252a-1 and the curved portion 252a-2.

A first touch sensor 252b is disposed to cover part of the planar portion 252a-1 and the curved portion 252a-2, so as to detect touch input to the central region (C) of the window 252a. A second touch sensor 252c is provided with a curved surface touch sensing portion 252c-1 disposed to cover a portion of the curved portion 252a-2, and configured to sense touch input to the edge region (S) of the curved portion. A curved surface touch sensing portion 252c-1 may extend in one direction of the terminal body (the lengthwise direction (L) of the terminal body in drawings of the present invention), and may be configured to sense continuous touch input in said one direction.

The present invention provides various user interfaces using a structure where the curved surface touch sensing portion 252c-1 is disposed at the edge region (S) of the curved portion 252a-2.

Hereinafter, various methods for controlling the mobile terminal 200 using the second touch sensor 252c, will be explained in more detail with reference to FIGS. 12 to 14.

Figure 12:
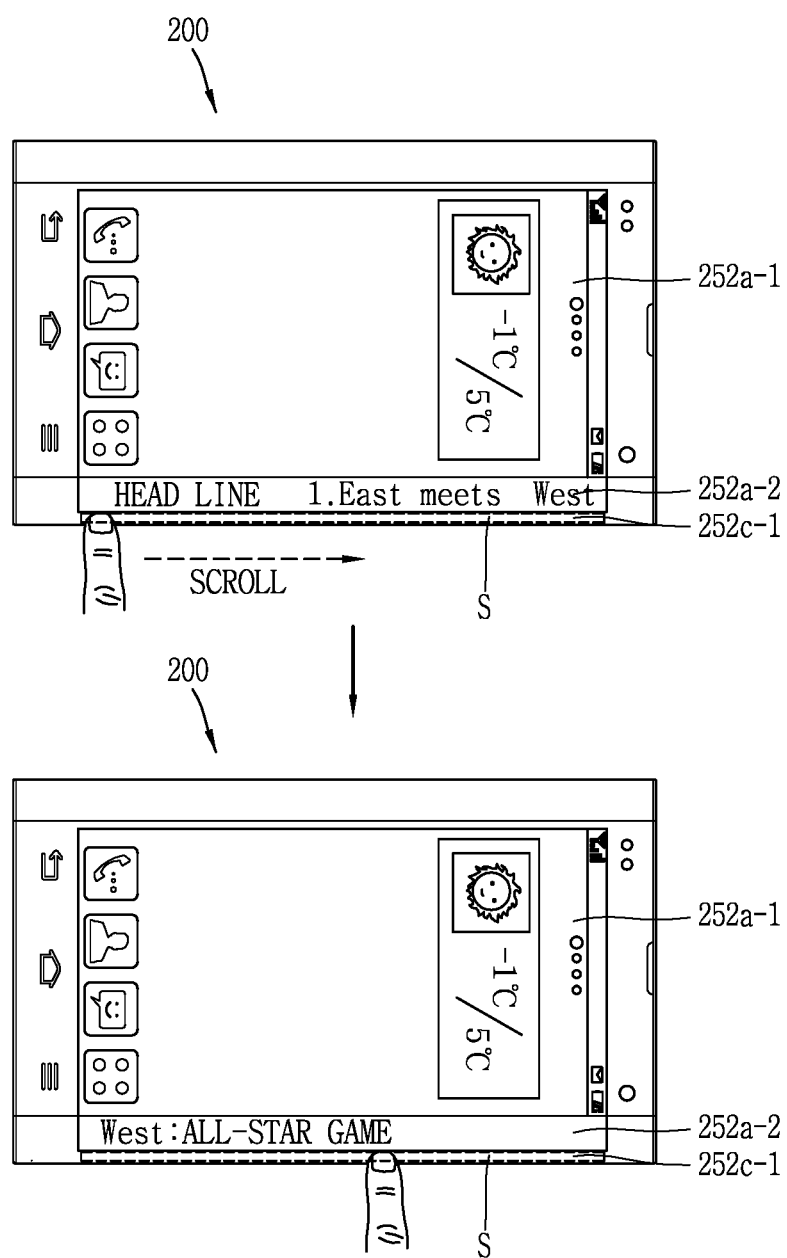
FIGS. 12 to 14 are conceptual views illustrating various methods for controlling a mobile terminal using a second touch sensor of FIG. 11.
Figure 13:
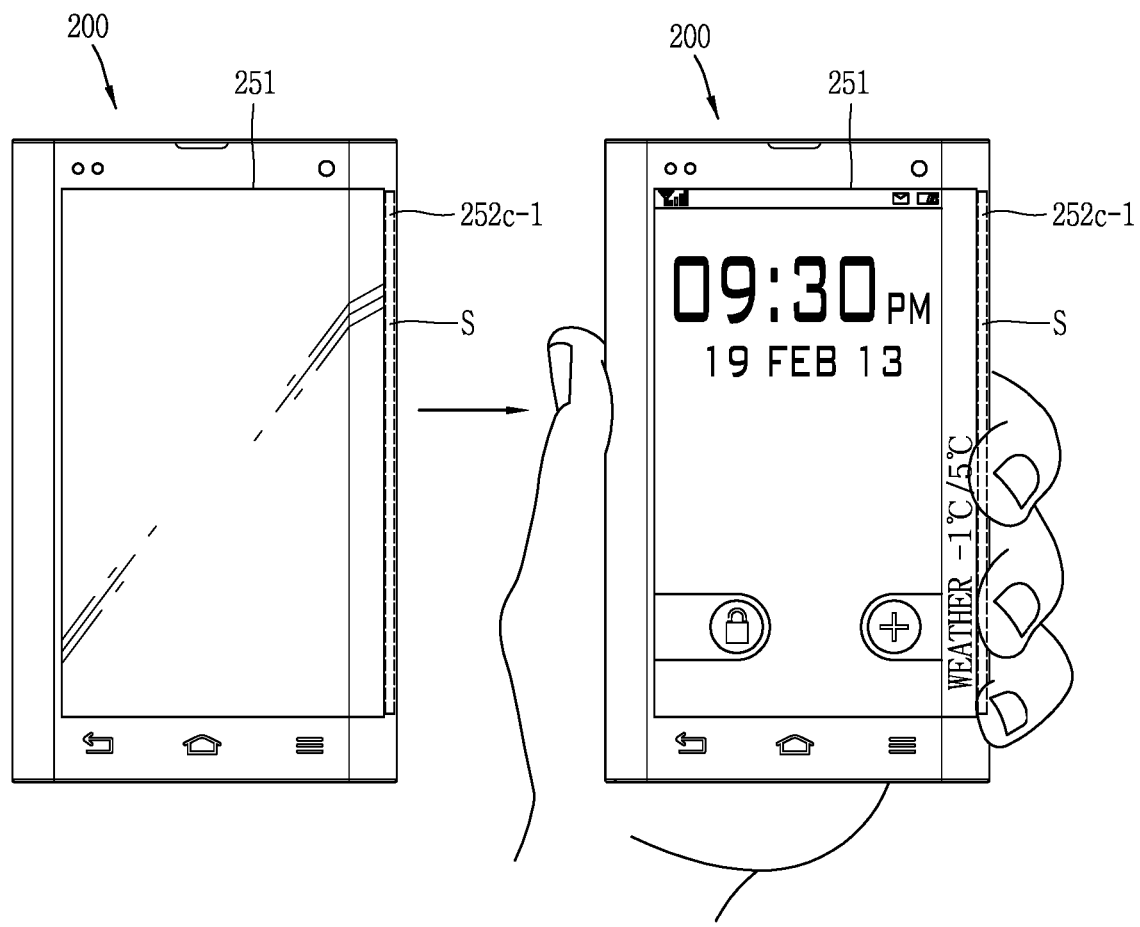
Figure 14:
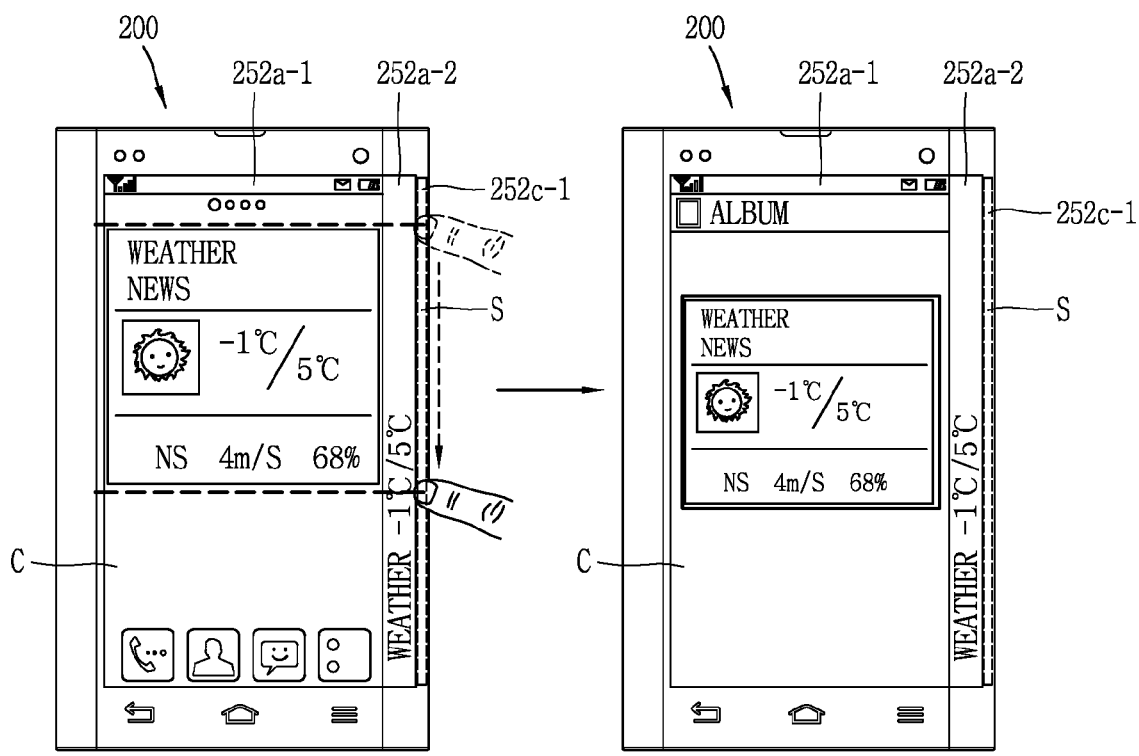

FIGS. 12 to 14 are conceptual views illustrating various methods for controlling the mobile terminal 200 using the second touch sensor 252c. FIGS. 12 to 14 illustrate the curved portion 252a-2 in an un-curved manner, so that visual information output to the planar portion 252a-1 and the curved portion 252a-2 can be both shown for purposes of discussion.

Referring to FIG. 12, visual information, which is different from that output to the planar portion 252a-1, may be output to the curved portion 252a-2. In FIG. 12, a news headline is displayed on the curved portion 252a-2.

Upon detection of continuous touch input to the curved surface touch sensing portion 252c-1 in the lengthwise direction (L) of the terminal body, the controller controls the visual information output to the planar portion 252a-1 and the curved portion 252a-2 to be changed.

As shown, if a continuous touch (scroll) is performed from one point on the edge region (S) corresponding to the curved surface touch sensing portion 252c-1 to another point, a text including a news headline may be moved to the next or previous item. Under such configuration, a user can change the visual information output to the curved portion 252a-2 such that the visual information is visible.

Referring to FIG. 13, upon detection of a multi-touch input to the curved surface touch sensing portion 252c-1 when the display 251 is in a deactivated state, the controller may convert the deactivated state of the display 251 into an activated state. Under such configuration, if a user holds the deactivated mobile terminal 200, the display 251 is turned on so that information (e.g., date, time, weather, missed calls, whether messages have been received or not, etc.) can be displayed thereon.

Further, upon detection of a motion of the mobile terminal by an acceleration sensor, a gyro sensor, etc., the controller may convert the deactivated state of the display 251 into an activated state.

Referring to FIG. 14, upon detection of continuous touch input to the curved surface touch sensing portion 252c-1 in the lengthwise direction (L) of the terminal body, the memory may capture and store visual information output to the planar portion 252a-1 and/or the curved portion 252a-2.

For instance, if the continuous touch (scroll operation) is performed toward the lower end of the edge region (S) when the upper end of the edge region (S) of the curved portion 252a-2 is in a touched state, the memory may capture a screen shot output to the planar portion 252a-1 and/or the curved portion 252a-2. While the scroll operation is performed, a visual effect (e.g., formation of a scanning line) may be implemented on the captured screen in the scrolling direction.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body;
a display mounted to the terminal body and configured to output content;
a window disposed to cover the display and comprising a central region and an edge region, wherein:
the central region is formed of a transmissive material and configured to align with the display, and
the edge region is formed of an opaque material and configured to surround the central region; and a controller configured to:
  detect at least one touch input comprising a continuous dragging touch input to the edge region; and
  store a data item comprising a screenshot of at least a portion of the displayed content in response to detecting the at least one touch input to the edge region,
wherein boundaries of the screenshot are defined by a width of the displayed content and a height corresponding to the at least one touch input.

2. The mobile terminal of claim 1, further comprising:
a first touch sensor disposed to span at least the central region and configured to detect a touch input to the central region; and
a second touch sensor disposed to span at least part of the edge region and configured to detect a touch input to the at least part of the edge region, wherein the second touch sensor is configured to have a higher touch sensitivity than the first touch sensor in order to detect a touch input to the opaque edge region, and
wherein:
the first touch sensor overlaps at least a portion of the second touch sensor at a position corresponding to the edge region, and
the second touch sensor is disposed between the window and the first touch sensor.

3. The mobile terminal of claim 2, wherein the second touch sensor comprises:
a primary touch sensing portion disposed at one end of the mobile terminal and extending along a width of the window; and
a secondary touch sensing portion disposed at a first side of the window and extending from the first touch sensing portion along a length of the window.

4. The mobile terminal of claim 3 further comprising a memory, wherein:
the primary touch sensing portion is configured to detect touch inputs while the display reproduces moving images; and
the memory is configured to store the detected touch inputs with the moving images according to the time the touch inputs were detected with respect to the reproduced moving images.

5. The mobile terminal of claim 3, wherein the secondary touch sensing portion is configured to detect at least one continuous touch input in a lengthwise direction of the terminal body.

6. The mobile terminal of claim 5, wherein the controller is further configured to control the display to change the visual information output in response to detection of the at least one continuous touch input.

7. The mobile terminal of claim 5, further comprising a memory configured to store at least a portion of the visual information output on the display in response to detection of the at least one continuous touch input.

8. The mobile terminal of claim 3, wherein the second touch sensor further comprises a tertiary touch sensing portion disposed at a second side of the window that is opposite the first side, wherein the tertiary touch sensing portion extends from the first touch sensing portion along the length of the window.

9. The mobile terminal of claim 8, wherein the controller is further configured to convert the display to an activated state in response to touch inputs detected by the secondary touch sensing portion and the tertiary touch sensing portion while the display is in a deactivated state.

10. The mobile terminal of claim 8, wherein the controller is further configured to change the visual information output on the display in response to consecutive proximity touch inputs detected by the secondary touch sensing portion and the tertiary touch sensing portion.

11. The mobile terminal of claim 2, wherein:
the display comprises a planar portion and a curved portion, the curved portion disposed at a first lateral edge of the terminal body and continuously extending from the planar portion;
the display is further configured to output different visual information to the planar portion and the curved portion; and
the second touch sensor comprises a curved surface touch sensing portion disposed at the first lateral edge of the terminal body and extending along a length of the window;
wherein the curved surface touch sensing portion is configured to detect touch inputs to the window corresponding to at least part of the curved portion of the display.

12. The mobile terminal of claim 11, wherein the controller is further configured to control the display to change the visual information output to at least the planar portion or the curved portion in response to at least one continuous touch input in a lengthwise direction of the terminal body detected by the curved surface touch sensing portion.

13. The mobile terminal of claim 11, wherein the controller is further configured to convert the display to an activated state in response to a multi-touch input detected by the curved surface touch sensing portion while the display is in a deactivated state.

14. The mobile terminal of claim 11, further comprising a memory configured to store visual information output on at least the planar portion or the curved portion in response to at least one continuous touch input in a lengthwise direction of the terminal body detected by the curved surface touch sensing portion.

15. The mobile terminal of claim 11, wherein the controller is further configured to move the visual information to display previous visual information in response to one or more touch inputs on the edge region.

16. The mobile terminal of claim 1, further comprising a touch input unit detachably mounted to the terminal body and configured to apply touch inputs detected by the first touch sensor or the second touch sensor wherein the controller is further configured to deactivate the second touch sensor while a touch input is being detected by the first touch sensor.

17. A method for controlling a mobile terminal, the method comprising:
displaying content on a first display portion of a window;
detecting at least one touch input to an opaque touch portion of the window that surrounds the first display portion; and
storing a data item in response to detecting the at least one touch input,
wherein:
the at least one touch input comprises a continuous dragging touch input for a user defined distance in a lengthwise direction of the mobile terminal;
the stored data item comprises a screenshot of at least a portion of the displayed content, and
boundaries of the screenshot are defined by a width of the displayed content and a height corresponding to the user defined distance.

18. The method of claim 17, wherein:
the displayed content comprises a video file;
the stored data item comprises an image of the detected at least one touch input; and
the image is stored with the video file according to a time the at least one touch input was detected with respect to the video file being displayed.

\* \* \* \* \*